2 Sheets--Sheet 1.

E. H. STEARNS.
Sawing-Machines.

No. 144,154. Patented Oct. 28, 1873.

Witnesses
James B. Kay
R. E. Henderson

Inventor
Edward H. Stearns,
by Bakewell, Christy & Kerr,
his Atty's

E. H. STEARNS.
Sawing-Machines.

No. 144,154.

2 Sheets--Sheet 2.

Patented Oct. 28, 1873.

WITNESSES
James L. Kay
R. E. Henderson

INVENTOR
Edward H. Stearns,
by Bakewell, Christy & Kerr,
his Att'ys.

UNITED STATES PATENT OFFICE.

EDWARD H. STEARNS, OF ERIE, PENNSYLVANIA.

IMPROVEMENT IN SAWING-MACHINES.

Specification forming part of Letters Patent No. 144,154, dated October 28, 1873; application filed April 14, 1873.

*To all whom it may concern:*

Be it known that I, EDWARD H. STEARNS, of Erie, in the county of Erie and State of Pennsylvania, have invented a new and useful Improvement in Sawing-Machines; and I do hereby declare the following to be a full, clear, and exact description thereof, reference being had to the accompanying drawings, in two sheets, making a part of this specification, in which—

Figure 1:
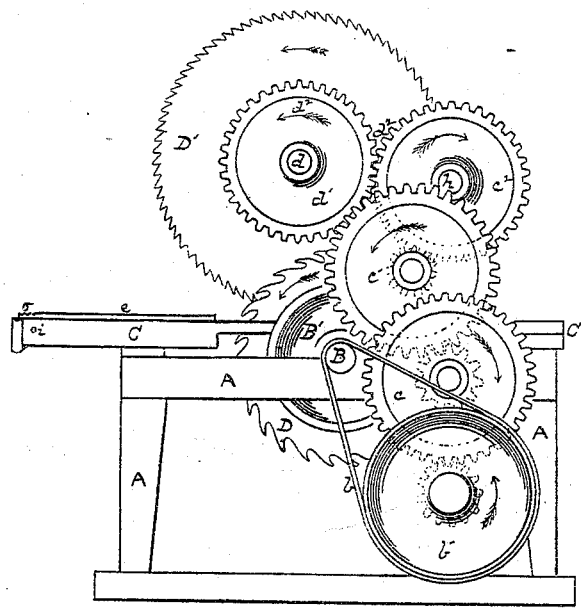
Figure 2:
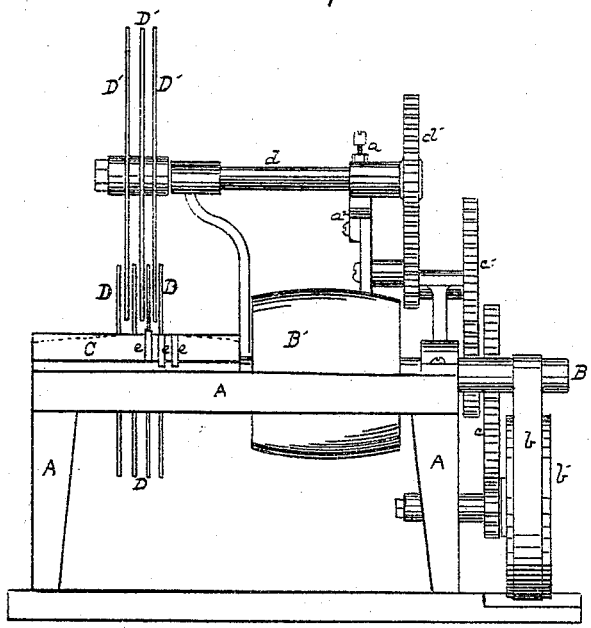
Figure 3:
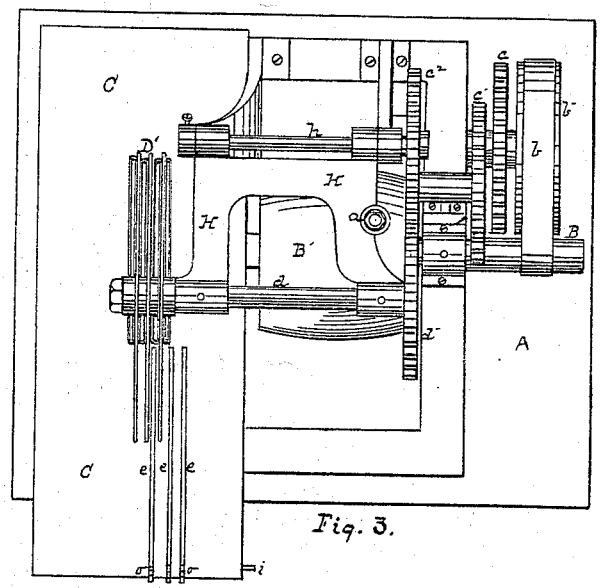
Figure 4:
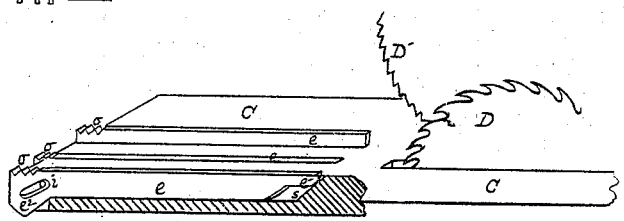
Figure 5:
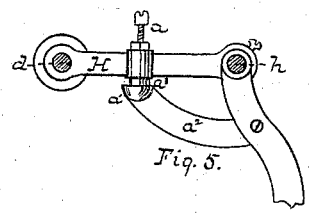

Figure 1, Sheet 1, is a side elevation of my improved machine. Fig. 2, Sheet 1, is a front elevation thereof. Fig. 3, Sheet 2, is a top or plan view. Fig. 4, Sheet 2, is a perspective view of a section of the table, illustrative of the construction and operation of the feed-guides; and Fig. 5, Sheet 2, illustrates, by detached view, the swinging frame which carries the feed-disk and its mode of adjustment.

Like letters of reference indicate like parts in each.

My improved machine, while adapted for use in slitting boards, slabs, and bolts generally, is particularly designed for the manufacture of lath, pickets, and for the slitting of short bolts, or boards or pieces of lumber of comparatively short length, so as to work them up into any desired shape for sale or use with or without further work being expended thereon; and the nature of it consists, first, in combining, with one or more circular saws, a toothed sheet-metal feed disk or disks, which, in use, shall overlap the saws between the points at which the saw-teeth pass through the bolt or block, and which shall also be self-adjusting for the purpose of feeding forward bolts of different thicknesses; second, in the arrangement of the gearing by which the saws and the feed disk or disks are operated; and, third, in the construction of guiding or gaging devices, as hereinafter described.

To enable others skilled in the art to make and use my improvement, I will proceed to describe its construction and mode of operation.

On any suitable frame-work, A, I mount the saw-arbor B and the feeding-table C, in proper relative position for the operation of the saws D, which, in any desired number, are fixed on the saw-arbor B. The feed-table is slotted, so that the saws may work through them in the usual way, and the saws are placed on the arbor outside of its bearings for convenience in removing or readjusting or sharpening. They are set at the proper distance apart for sawing bolts, or other lumber to be sawed, in pieces of the desired width or thickness, in the usual way, and are driven by means of the band-wheel $b'$.

It has been usual in such machines to employ, both in front and in rear of such saws, a pair of feed pressure-rollers, the front pair being designed to feed the lumber to the saws, and the rear ones to deliver and guide the same from the saws. In sawing short bolts or pieces, as in the manufacture of lath and pickets, difficulty has been experienced in machines having such pressure-rollers, from the fact that the saw-teeth on the rising side of the saw are apt to throw the bolt upward and away from the saws before it is caught by the rear pressure-rollers, and also from the fact that the same effect is produced on the opposite end of the bolt after it has left the front rollers. To overcome these difficulties as well as others, I combine, with such a gang of saws, one or more toothed disks, D', which are arranged on an arbor, $d$, nearly or directly over the saw-arbor, parallel therewith, and preferably directly over the saw-arbor, or a little forward for slitting bolts having an uneven upper surface, and a little back for slitting bolts having an even surface into lath or other like articles. These disks are made of sheet or plate metal, and the serrations are similar to those made in saws, so that the saws and disks differ but little, if at all, in form; and in order that the disk or disks D' may automatically rise and fall with the varying thickness of the bolt or bolts, I mount each arbor in a swinging frame, H, which is so connected with the arbor $d$, and with some fixed part of the machine, as the shaft $h$, so that, in rising and falling, such disk or disks will move in a vertical plane. The edges of the disk or disks D' are toothed, as shown, and they receive a positive motion, so as to feed the bolt or lumber forward to the saws, and through them in the direction desired. While the disks D' are free to rise, they are prevented from coming in contact with the feed-table by means of any suitable stop device which shall, at the proper point, arrest their downward motion. One such device I have shown. It consists of a set-screw, $a$, which plays through the frame H and bears at its lower end against a fixed block, $a^1$, such block being, by an arm, $a^2$, connected with any part of the machine. I prefer to make on the upper face of the block $a^1$ an elastic cushion, $a^3$, of india-rubber or other suitable material, the function of which is partly to relieve the jar, to which the apparatus would otherwise be subject when coming down suddenly, and partly to give a partial support to the frame and disks in sawing very thin stuff where the rise and fall of the disks is but little; also, by means of a set-screw, $a$, I provide for lowering the disks $D'$ as they become worn, so that they shall, when down, always be at about the same distance from the table—say, about seven-eighths of an inch, more or less.

For the purpose of imparting the desired positive motion to the disks $D'$ and rendering that motion comparatively slow, as is necessary for feeding purposes, I take the motion from the saw-arbor B by means of a band, $b$, to a band-wheel, $b'$, and thence through a train of gearing, $c$ $c^1$ $c^2$, with suitable interposed pinions, and thereby communicate motion to the gear-wheel $d^1$ on the disk-arbor $d$. While the relative number and sizes of these gear-wheels may be changed, they should be such as to secure two results—first, imparting a feed-motion to the disks in the desired direction and with the desired speed; and, second, communicating power to the gear-wheel $d^1$ in such direction that it will co-operate with the bolt, which is being fed in, in lifting the disk, or, in other words, that the power communicated to the gear-wheel $d^1$ shall act on the teeth of such wheel by an upward pressure, as illustrated at $d^2$ by means of the arrows, on the faces of the gear-wheels, which there mesh into each other.

This latter result, while not interfering with the forward feed of the bolt, materially assists the disks $D'$ in rising up onto the bolt or slab, or onto any elevations which may occur on its face; or, what amounts to the same thing, the power thus communicated sustains a part of the downward pressure of the swinging frame H, the disk-arbor $d$, and the disks $D'$, so that such pressure shall not be in excess of what is required, and shall not be so great as to prevent the disks from rising readily on the slab or bolt when presented.

If, now, a bolt, block, slab, or other short piece of lumber be presented to the saws by the operator, it will, at about the time, or very soon after, the sawing commences, be caught by the disks described and fed forward, and such feed will be continued by the actual contact of the teeth of the disks with the upper surface of the bolt until the sawed strips are discharged at the opposite periphery of the saws; and during the whole of the said operation the bolt will be held down—first at its forward end, to prevent the rising teeth of the saws from throwing it up, and lastly at its rear end, to secure the same result.

In this way I am enabled to dispense with both front and rear pressure-rollers, and, by so doing, enable the operator at once to take the remnants which may be slit off the edge of the slab or bolt unsawed, and run them through the saws without waiting for the rear pressure-rollers to discharge them; and the upper surface of the feed-table is made sloping from each outer saw of the series toward the edges, as illustrated by the dotted lines in Fig. 2, the better to facilitate the throwing off of the edge-remnants from contact with the saws.

Figs. 1 to 4 illustrate the construction of an improved guide or gage used in connection with such machine as that described. The end of the table C next the operator has a series of slots in its upper face as far apart from edge to edge as the breadth of the material to be sawed, and such slots are made in line with the saws. In each of these slots I arrange a guide, $e$, having the form substantially as shown in Fig. 4—that is to say, an incline, $e^1$, at or near the forward end of each—and in the outer end a slot, $e^2$, having a like incline both in length and slope. The bottoms of the slots in the table are such that the guides, when inserted, will rest thereon, but with an inclination, $s$, in such position relatively to the incline $e^1$ of the guides that, as the guides are thrust forward, they will rise on these inclines above the face of the table. A pin, $i$, passes through the slot $e^2$ of the guides and holds them in place, and at the same time permits the rear end of them to rise when they are thrust forward. When down, the upper faces of the guides are flush with the surface of the table, and their rear ends project beyond the end of the table. The operator, judging readily by his eye of the number of strips which a bolt is capable of producing, strikes the end of his bolt, as he brings it up to feed in, against the proper gage for giving him that number of sawed strips, places the bolt against that gage, and feeds it in, in the usual manner. If, in sawing the next bolt, he desires to employ a different gage, he catches the end of his bolt on the teeth $o$ of the gage, which is up, draws it back, and thus throws it down, strikes the end of another gage, which throws it up, and proceeds as before. These gages, and the slots in which they work, are of the same thickness as the breadth of the kerf, so that the bolts may feed in on either side of any gage.

I am aware of the devices described in the patent to O. C. Meigs, August 20, 1872, and such devices are hereby disclaimed as forming any part of the invention herein described and claimed.

What I claim as my invention, and desire to secure by Letters Patent, is—

1. The sheet-metal toothed disk or disks $D'$, arranged relatively to and in combination with the circular saws D, and operative conjointly therewith, substantially in the manner and for the purposes set forth.

2. The combination of one or more disks, D', swinging frame H, arbor $d$, and gear-wheels $d^1 c^2$, relatively arranged substantially as set forth.

3. A guide or gage, $e$, having an inclined slot, $e^2$, at its rear end, in combination with a pin, $i$, and a recess in the feed-table, having an incline, $s$, substantially as set forth.

In testimony whereof I, the said EDWARD H. STEARNS, have hereunto set my hand.

EDWARD H. STEARNS.

Witnesses:
   A. J. LUCAS,
   G. H. CHRISTY.